United States Patent
Ellemor

Patent Number: 5,283,029
Date of Patent: Feb. 1, 1994

[54] METHOD OF MOULDING A SHEET INCLUDING THE USE OF HEATED BARRIER FLUID

[76] Inventor: John W. Ellemor, Cnr. Main Road and One Tree Hill Road, Ferny Creek, Victoria, Australia

[21] Appl. No.: 983,603

[22] Filed: Nov. 30, 1992

Related U.S. Application Data

[63] Continuation of Ser. No. 311,414, Feb. 15, 1989, abandoned, which is a continuation of Ser. No. 810,369, filed as PCT/AU85/00062 Mar. 27, 1985, published as WO85/04364, Oct. 10, 1985, abandoned.

[30] Foreign Application Priority Data

Mar. 27, 1984 [AU] Australia .................. PG4268/84

[51] Int. Cl.⁵ .................. B29C 51/10; B29C 51/34; B29C 51/42
[52] U.S. Cl. .................. 264/544; 264/547; 264/549; 264/522; 425/384
[58] Field of Search .................. 264/519, 522, 544, 547, 264/549; 425/384, 387.1, 388, 390, 389

[56] References Cited

U.S. PATENT DOCUMENTS

| | | | |
|---|---|---|---|
| 2,123,552 | 7/1938 | Helwig | 425/140 |
| 2,142,445 | 1/1939 | Helwig | 264/544 |
| 2,599,554 | 6/1952 | Howenstine | 425/387.1 |
| 2,832,094 | 4/1958 | Groth | 425/553 |
| 2,917,783 | 12/1959 | Olson et al. | 264/547 |
| 2,973,558 | 3/1961 | Stratton, Jr. | 264/550 |
| 2,983,955 | 5/1961 | Gajdosik | 264/544 |
| 3,003,190 | 10/1961 | Macks | 264/570 |
| 3,020,596 | 2/1962 | Clapp et al. | 264/522 |
| 3,349,510 | 10/1967 | Beck . | |
| 3,388,428 | 6/1968 | Buchholz | 264/544 |
| 3,400,111 | 9/1968 | Schwartz | 264/522 |
| 3,482,281 | 12/1969 | Thiel | 425/384 |
| 3,488,413 | 1/1970 | Watts, Jr. | 264/550 |
| 3,558,298 | 1/1971 | Carmi et al. | 65/356 |
| 3,662,048 | 5/1972 | Turner | 264/85 |
| 3,737,496 | 6/1973 | Voorhees, Sr. | 264/544 |
| 4,043,735 | 8/1977 | Farrell | 425/389 |
| 4,057,382 | 11/1977 | Yamamori | 425/387.1 |
| 4,139,586 | 2/1979 | Gasson | 264/522 |
| 4,256,449 | 3/1981 | Sauer | 264/544 |

FOREIGN PATENT DOCUMENTS

| | | |
|---|---|---|
| 234341 | 2/1960 | Australia . |
| 235335 | 5/1960 | Australia . |
| 243061 | 9/1962 | Australia . |
| 416677 | 6/1969 | Australia . |
| 58-132510 | 8/1983 | Japan . |
| 2048150 | 12/1980 | United Kingdom . |
| 2100645 | 1/1983 | United Kingdom . |

Primary Examiner—Catherine Timm
Attorney, Agent, or Firm—Nixon & Vanderhye

[57] ABSTRACT

A method of and apparatus for moulding preformed material with a forming mould (1), tool, membrane or bag, in which as the material (A) is being moulded or shaped, a temperature controlled fluid is introduced at a sufficient pressure to act as a barrier between the material and the forming mould, tool, membrane or bag so that thickness of the article formed can be selectively controlled.

6 Claims, 1 Drawing Sheet

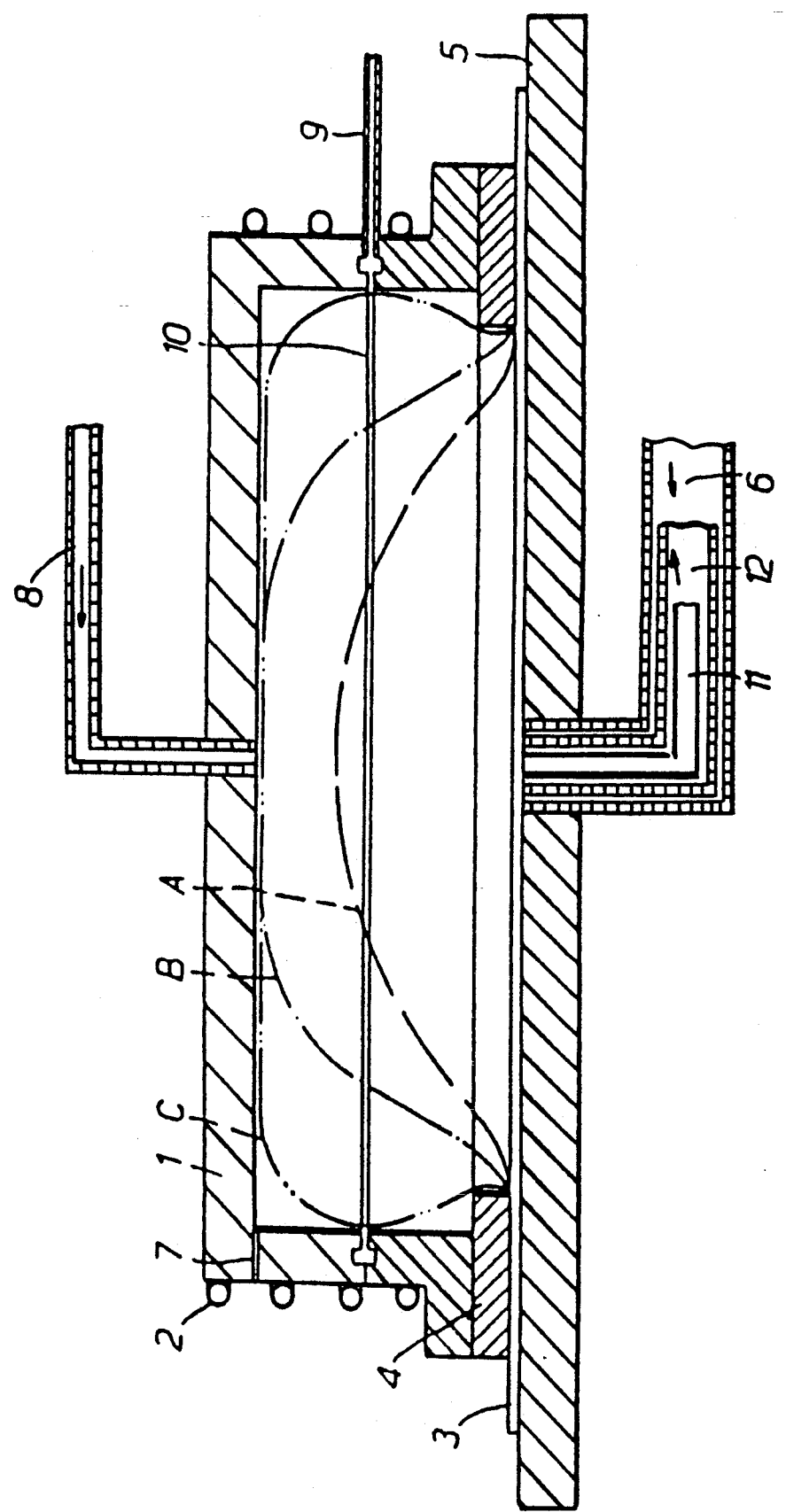

METHOD OF MOULDING A SHEET INCLUDING THE USE OF HEATED BARRIER FLUID

This is a continuation of application Ser. No. 07/311,414, filed Feb. 15, 1989, now abandoned, which is, in turn, a continuation of application Ser. No. 06/810,369, filed Mar. 14, 1986 as a revival of U.S. national application papers filed Nov. 26, 1985 based on PCT/AU 85/00062 (which were held to be copending by USPTO decision dated Jan. 9, 1987), now also abandoned.

The present invention relates to improvements in methods of and apparatus for blow moulding from preformed material. The preformed material may be a flow of solid or tubular glass or plastics for production of bottles and other hollow bodied articles although the preferred material is thermoplastic sheet material.

Many methods of blow moulding, particularly blow moulding of thermoplastic sheet are known including:

i) Pressure forming wherein a heated sheet, clamped between at least two parts of a mould, is stretched by gas under pressure to conform with the internal shape of the mould.

ii) Vacuum forming wherein a vacuum is applied to suck the clamped heated sheet into conformity with the internal shape of a mould.

iii) Mechanical pressure forming wherein an additional part or parts applies mechanical pressure to one or both surfaces of the clamped heated sheet so that the sheet conforms to the shape of the additional part or parts. This includes the use of male forming tools or inflatable membrane or bags within the mould.

iv) A variation of pressure forming wherein the sheet is stretched through an opening with no limitations beyond that opening, the shape of the article thus formed being determined by the volume of introduced gas.

Other methods, which may include features of the above most commonly used methods, are also known.

A problem associated with the above methods for forming articles particularly in the case of articles formed from sheet is that when forming complicated shapes, particularly shapes formed in a mould which is made from more than two parts and is under-cut as for example a re-entrant diffuser for a lighting fixture, considerable thinning occurs as the last sector stretches to achieve the final shape at corners or in deep recesses. In such cases this thinning often precludes the possibility of forming these articles from thermoplastic sheet, as present practice limits the depth of undercuts obtainable in the final article.

The most likely method to be used to form such articles would be pressure forming as moulds required for such shapes are usually made from more than two parts and sealing problems often preclude the vacuum forming method. Mechanical pressure forming for such shapes is unlikely to be satisfactory.

Another problem particularly relevant to pressure forming is that the surface of the sheet that has come into contact with the mould is often marred by small pit marks which in many cases would require rubbing down to a smooth surface and then repolishing. This problem often precludes the use of smooth sheet and manufacturers are forced to use low gloss of patterned sheet.

It is the object of the present invention to at least in part overcome these problems and permit the moulding of some shapes that have hitherto not been possible.

The present invention can be utilized to best advantage in conjunction with the method described as pressure forming particularly when forming complex shapes. Features of the invention can also be useful when forming certain shapes by mechanical pressure forming or by a combination of these methods or combining either or both of these methods with vacuum forming.

According to the present invention, there is provided improvements in a method of moulding preformed materials, wherein, while the material is being moulded or shaped, temperature controlled fluid is introduced at sufficient pressure to act as a barrier between the material and the forming mould, tool, membrane or bag, to thereby selectively control the thickness of the article so formed.

Use of the barrier fluid in preventing contact between the mould, tool, bag or membrane and the material, improves the surface finish of the article.

The introduction of the barrier fluid is, in the case of pressure forming, additional to the forming fluid under pressure used for moulding and stretching the material to the limits provided by the internal shape of the mould. The forming fluid may also be temperature controlled. Both or either fluids may be air.

As the stretching sheet progressively conforms to the shape of the mould a thin layer of the barrier fluid prevents it from contacting the surface of the mould but still allows the sheet to closely conform to the shape of the mould. By preventing the forming sheet from contacting the mould a more uniform thickness throughout the greater part of the finished article is achieved or if desired the article being moulded can, by adjustments of temperature, have thicker or thinner sections in selected areas. This process has the further advantage gained by the selective control of thickness that can also be used to provide the possibility of forming shapes previously impossible to mould from sheet by any other known method.

Upon achieving the desired final shape, the forming fluid can be maintained at sufficient pressure to hold the shape while excess fluid can escape by way of a separate opening or openings allowing a flow of fluid, preferably at a lower temperature, to circulate and cool the moulded article. Due to this circulating fluid, the mould can be operated at a higher temperature resulting in further improvement of the surface finish.

In addition the temperature of the barrier fluid supply may be lowered at this time to further assist in the cooling of the moulded article.

Alternatively the material may be shaped by stretching with a male forming tool, the introduced temperature controlled fluid acting as a barrier between the material and the forming tool to selectively control the thickness of the material.

An inflatable bag or membrane could also be used as the forming tool. Other possibilities include leading edges of mechanical tools and diaphragms, all once again incorporating fluid outlets to create the fluid barrier. Although the fluid may be gas, preferably air, it is to be understood that any fluid or gas inert to the material being formed may be used.

The present invention also provides improvements in apparatus for producing moulded articles, said apparatus having means whereby temperature controlled fluid may be introduced at a pressure sufficient to act as a barrier between the material being moulded and the forming mould, tool, membrane or bag. In the case of combining a forming mould with a male forming tool, membrane or bag, means can also be provided whereby a second fluid barrier is created on the other side of the material. In forming with a tool, membrane or bag, only a single barrier is required when used in conjunction with a vacuum process.

The mould, tool, membrane or bag is provided with one or a number of outlets for the fluid, usually air. The outlets may be arranged randomly, in regular patterns and usually at or adjacent to the point or points whereat the material will first come into contact with the mould, or at or adjacent to the leading edges. The outlets may be of many shapes, including pinholes, gaps or slits. The mould, tool, membrane or bag may even be porous, so that the outlets are dispersed over the porous surface.

The outlets are connected to a supply of fluid under pressure, means for adjusting and controlling both the pressure and temperature of the fluid being provided, so that at selected times during the moulding cycle, temperature controlled fluid is forced at a suitable pressure into the mould to provide the barrier.

But in order that the invention may be more clearly understood, reference will now be made to the accompanying drawing which shows a mould and accessories designed to produce a shape suitable as a re-entrant acrylic diffuser for use in a circular fluorescent light fixture.

The mould 1 is preheated by a flow of temperature controlled oil through heating control tube 2. The assembly comes apart to admit the introduction of preheated sheet 3 and then comes together, as illustrated clamping the sheet between the combined two halves of split ring 4 and sealing plate 5. Heated air is introduced through forming inlet 6, causing the sheet 3 to stretch. As the sheet expands, it causes air trapped within mould 1 to escape through vent 7. As position (A) is reached and it is about to make contact with the upper surface of the mould 1, a second supply of heated air is introduced through mould air outlet 8 providing a barrier between the sheet 3 and the mould 1. As the sheet reaches position (B), the combination of mould 1 temperature and barrier air temperature is such as to allow the sheet 3 to stretch uniformly. Upon reaching position (C), where sheet 3 is about to contact the wall of the mould 1, heated air, delivered to the wall of the mould through a second mould air outlet 9 and supplied by way of a chamber to gap 10, similarly prevents contact of the sheet with the mould and allows the sheet 3 to stretch until it closely conforms with the inside shape of the mould. At this point the rising air pressure within the sheet 3, supplied through forming air inlet 6 causes a pressure actuated switch (not shown) attached to pressure sensor tube 11 to stop air flowing into the mould 1 through mould air outlet 8 and through gap 10 and at the same time disconnects the heating element supplying air through forming air inlet 6. As the pressure rises still higher and the desired shape is achieved a second pressure actuated switch (not shown) attached to pressure sensor tube 11 opens a solenoid valve (not shown) connected to exhaust outlet 12 through a restriction which is adjusted to allow sufficient flow of the now cold air to circulate within the shape to assist cooling, while at the same time maintaining sufficient pressure to prevent the shape from collapsing during the cooling process. The cooling air within the article so formed allows a temperature differential across the thickness of the article to facilitate removal of the article from the hot mould. Upon the article cooling sufficiently to allow removal from the mould, the assembly opens including the separation of the two halves of the split ring.

When using the above described apparatus to form a 19⅜" (492 mm) diameter diffuser from ⅛" (3.2 mm) cast acrylic sheet, the forming fluid was air at approximately 50 psi, while the barrier fluid, again air was maintained at a pressure at least 10% higher. The thickness of the diffuser varied between 0.9 and 1 mm, except in the rim area where the increased thickness was used for mounting purposes.

In this simple explanation many of the details have been deleted, such as arrangements for directing the forming air to facilitate rapid cooling, the various pressure differentials required and diffusing arrangements for the forming air, as these and other details are well known to those skilled in the art, and have no bearing on the principles involved. The circulation of cold air within the moulded article during the final stage of the cycle allows the use of a higher temperature mould which also improves the surface finish.

Although the invention has been described with reference to the blow moulding of thermoplastic sheet material, it will be apparent that it can equally apply to moulding of other preformed material, such as a flow of solid or tubular glass or plastic for bottles and other hollow bodied articles.

Since other modifications within the spirit and scope of the invention may readily be effected by persons skilled in the art, it is to be understood that this application is not limited to the particular process described by way of example hereinabove.

I claim:

1. A method of moulding an article of complicated shape out of a preformed sheet with the use of a female forming element having an internal surface of complicated shape, comprising:

progressively stretching said sheet to a position approaching said internal surface of the forming element by applying pressure to the sheet from the side thereof opposite the female forming element, introducing a heated fluid into the forming element during said stretching in the vicinity of one or more portions of said internal surface of the forming element which would otherwise be first contacted by the sheet in the absence of such a barrier, at a sufficient pressure to act as a continuously flowing thin barrier layer between the stretching sheet and said portion, controlling the pressure and temperature of the heated barrier fluid while the sheet continues to spread over adjacent areas of the forming element still separated by the thin layer of heated barrier fluid until it is stretched into substantially the final shape of the article in close conformity with said internal surface of the forming element while remaining out of contact with said forming element, wherein the pressure and temperature control is selected so as to obtain a predetermined thickness profile in the article which would otherwise be unobtainable given the complicated shape of the internal surface of the forming element, stopping the flow of the barrier fluid, and continuing to apply pressure to the sheet from the side thereof opposite the female forming element whereby to stretch the sheet further to the limits provided by the internal surface of the forming element.

2. A method as in claim 1, wherein the sheet is stretched by applying temperature controlled forming fluid under pressure.

3. A method as in claim 2 wherein, upon achieving the desired final shape of the sheet, the forming fluid is maintained at sufficient pressure to hold the shape while excess forming fluid escapes by way of a separate opening or openings, a flow of cold fluid being circulated internally within the article to cool the moulded sheet.

4. A method as in claim 3 wherein, upon achieving the desired final shape, the temperature of the barrier fluid is lowered to further assist in cooling the moulded sheet.

5. A method as claimed in claim 1, wherein the barrier fluid is air.

6. A method as claimed in claim 1, wherein said fluid is introduced through openings in said portions of the forming element which would otherwise be first contacted by the sheet in the absence of the barrier.

* * * * *